UNITED STATES PATENT OFFICE.

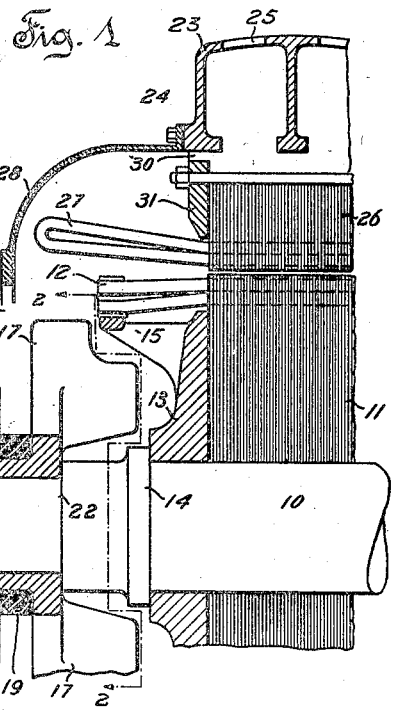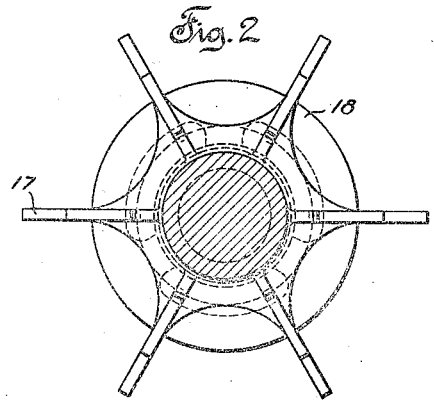

EMIL MATTMAN, OF MILWAUKEE, WISCONSIN, ASSIGNOR, BY MESNE ASSIGNMENTS, TO ALLIS-CHALMERS MANUFACTURING COMPANY, A CORPORATION OF DELAWARE.

DYNAMO-ELECTRIC MACHINE.

1,137,510.    Specification of Letters Patent.    Patented Apr. 27, 1915.

Application filed October 6, 1909. Serial No. 521,375.

*To all whom it may concern:*

Be it known that I, EMIL MATTMAN, a citizen of Switzerland, residing at Milwaukee, in the county of Milwaukee and State of Wisconsin, have invented certain new and useful Improvements in Dynamo-Electric Machines, of which the following is a full, clear, and exact specification.

My invention relates to dynamo-electric machines, and particularly to means for ventilating and cooling such machines.

One method of ventilating and cooling the windings and the internal structure of dynamo-electric machines is to force air over the parts to be cooled either by air blast from an outside source or by means of a special blower or fan arrangement mounted on some part of the rotating element of the machine.

The object of my invention is to provide a novel fan arrangement for the purpose of creating and circulating fluid currents to ventilate and keep cool the windings and structure of dynamo-electric machines.

In the accompanying sheet of drawings, Figure 1 is a partial longitudinal sectional view of an induction motor embodying my invention; and, Fig. 2 is a cross section on the line 2—2 of Fig. 1.

Mounted on the shaft 10 of a dynamo-electric machine is a core 11 which is preferably laminated and provided with slots for the reception of windings 12. The laminæ of the core 11 are held together by end disks, one of which is shown at 13 abutting a flange 14 on the shaft 10. The end disk 13 is provided with a projection 15 for the purpose of supporting the end turns of the windings 12. A sleeve 16 is also mounted on the shaft 10 and is provided with fan blades 17, which are preferably integral. The fan blades are located between current-collecting members or slip rings 18 and the rotor core 11, extending axially and radially of the machine under the end-turns of the rotor winding. The slip rings 18 are mounted on and insulated from the sleeve 16, and are spaced by insulating members 19. A nut 20 engages a threaded portion 21 of the shaft 10 to force the sleeve 16 firmly against an enlarged portion 22 of the shaft. The yoke 23 of the stator 24 is provided with ventilating openings 25 and is arranged to support a laminated stator core 26. This core is provided with the usual slots and windings 27. An end cover 28 incloses the cores and the windings and is provided with ventilating openings 29.

By means of the fans air which is drawn in through the ventilating openings 29 is forced outward between the projecting end-turns of the rotor and stator windings, thus keeping them cool. The end cover is so arranged and shaped as to direct the currents of air through openings 30 in end disks 31 out through the stator core structure and through the ventilating openings 25. By means of this arrangement the cooling air is kept in motion while the machine is in operation, none of it being pocketed, thus providing for a continual circulation of cooling fluid.

It is evident that there may be many modifications of the precise arrangement herein shown and described, and I aim in my claims to cover the invention broadly.

What I claim as new is:

1. In a dynamo-electric machine, the combination of a shaft, a core mounted on said shaft, a current collecting member, means mounted on said shaft for supporting said current collecting member, and fan blades mounted on said supporting means adjacent said core, and extending axially toward said core and effective to draw air across said collector and force the same toward the interior of the machine.

2. In a dynamo-electric machine, the combination of a shaft, a core mounted thereon and provided with a winding having extending end portions, a current collecting device mounted on said shaft, and fan means positioned intermediate said current collecting device and said core and operative with said parts, the working surfaces of said fan means being so disposed as to draw cooling fluid across the surface of said current collecting device and to force said fluid toward said core and about the end portions of said winding when said machine is in operation.

3. In a dynamo-electric machine, a shaft, a core mounted thereon and provided with a winding having projecting end portions, a current collecting device mounted on said shaft, and fan means mounted to rotate with said shaft and positioned intermediate said current collecting device and said core, the working surfaces of said fan means being of such form and so disposed as to draw air over the exterior surface of said collecting device and force the same outward through the end portions of said winding when the machine is in operation.

Milwaukee, Wis., Sept. 9, 1909.

In testimony whereof I affix my signature in the presence of two witnesses.

EMIL MATTMAN.

Witnesses:
CHAS. L. BYRON,
ROB. E. STALL.